United States Patent [19]

Powers et al.

[11] Patent Number: 5,091,745
[45] Date of Patent: Feb. 25, 1992

[54] FULL RANGE PLATEMAKER OPTICAL SYSTEM

[75] Inventors: Robert H. Powers, Honeoye Falls; Daniel H. Robbins, Rochester, both of N.Y.

[73] Assignee: A.B. Dick Company, Chicago, Ill.

[21] Appl. No.: 618,717

[22] Filed: Nov. 27, 1990

[51] Int. Cl.⁵ .............................................. G03B 27/70
[52] U.S. Cl. .................................................... 355/66
[58] Field of Search ............................. 355/43, 60, 66

[56] References Cited

U.S. PATENT DOCUMENTS

| | | | |
|---|---|---|---|
| 3,703,334 | 11/1972 | Knechtel et al. | 355/60 X |
| 3,752,924 | 3/1971 | Matsumoto et al. | 355/43 X |
| 4,032,231 | 6/1977 | Zucker | 355/66 X |
| 4,084,897 | 4/1978 | Queener | 355/60 X |
| 4,253,763 | 3/1981 | Schleifenbaum | 355/66 X |
| 4,451,142 | 5/1984 | Takenaka et al. | 355/55 |
| 4,488,804 | 12/1984 | Takagi | 355/56 |
| 4,989,033 | 1/1991 | Yamashita | 355/43 |

*Primary Examiner*—Richard A. Wintercorn
*Attorney, Agent, or Firm*—Morgan & Finnegan

[57] ABSTRACT

A graphic camera/platemaker optical system is described having a copyboard for an original subject, a lens, an image plane and a mirror. The copyboard, lens and mirror are independently movable such that they may move in different directions in order to produce a variable scale image or reproduction of the original onto the image plane. The movable elements are positioned by separate stepping drives controlled by a common microprocessor.

20 Claims, 5 Drawing Sheets

FULL RANGE PLATEMAKER OPTICAL SYSTEM

BACKGROUND OF THE INVENTION

1. Field of the Invention

This invention relates generally to graphic camera/platemaker optical systems, and, more particularly, to a method and apparatus for extending the magnification/reduction range and allowing greater access to the copyboard at higher magnifications. The method and apparatus further provides for movement of the lens, mirror and copyboard which maintains alignment of the lead edge of the original with the lead edge of the image for different magnifications.

Heretofore, graphic camera/platemaker optical systems with a copyboard for the original subject, a mirror, a lens and an image plane for producing images or reproductions of the original in a variable magnification/reduction scale have been known. In order to reproduce the original in a reduced or enlarged scale, the subject distance and the image distance are changed relative to the lens. To accomplish this, the relative positions of the optical elements of the graphic camera are changed in order to adjust the magnification/reduction scale.

Traditionally, graphic camera/platemaker optical systems have been designed such that the lens and copyboard are movable for the purpose of changing the image size in order to reproduce an original in a variable magnification/reduction scale. The mirror movement in these systems has been in one of the following three ways. The mirror has been fixed to the lens, thereby moving with it to create a linearly varying center on the copyboard such that copy location is non linear with respect to the lead edge of the image as magnification changes. Alternatively, the mirror has been fixed in space creating a fixed center on the copyboard with a non linear lead edge of the image. Finally, the mirror has been connected to the lens by a cam so that it moves in concert with the lens, that is, along the same center line as the lens, creating a non linearly varying center on the copyboard with a non linear lead edge relative to the image.

A camera similar to the graphic camera/platemaker optical system is the repographic camera shown in U.S. Pat. No. 4,253,763, issued to Schleifenbaum. This patent teaches that although the copyboard, lens and the image plane may all be constructed so as to be movable for the purposes of reproducing the original to a different scale, generally one of the components — usually the image plane — is held in a fixed position, and only the other two components (lens and copyboard) are linearly displaced. Specifically, this patent teaches that the lens is displaceable linearly along a guide, while the copyboard is movable up and down along a guide. Both the mirror and the image plane remain fixed.

One of the disadvantages with the traditional graphic cameras is that the position of the mirror establishes the magnification/reduction range for a particular focal length lens. The mirror in the traditional graphic cameras is either fixed in space or to the lens or connected to the lens so that it moves in concert with the lens, that is, along the same track as the lens. Such mirror positioning may preclude the use of larger copyboards and shorter focal length lenses which are suitable for greater reduction ranges. With shorter focal length lenses, the mirror would be moved toward the image plane and it could not project a large enough image from the copyboard.

The mirrors in such arrangements further limit access to the copyboard at higher magnifications by interfering with an operator's ability to open the copyboard cover. When using a platemaker, it is important for the operator to place an original accurately on the copyboard, at every magnification. At higher magnifications, the copyboard is raised to a point closer to the lens. Mirrors fixed in space or attached to the lens are positioned such that they block opening of the copyboard cover, thereby preventing the operator from placing an original accurately on the copyboard. As a result, the graphic camera can not operate effectively since the operator can not accurately place the lead edge of the original at the same distance from the head of the plate at these higher magnifications.

Other optical systems also teach changing image size by moving the optical elements. However, these systems also do not teach that the mirror can be moved independently of the lens in a manner that would avoid the problems in the traditional graphic cameras caused by the mirror which is either fixed in space or attached to the lens. For example, U.S. Pat. No. 4,451,142, issued to Takenaka et al., relates to a photographic system used for printing an original image on a photosensitive material such as enlarger, process camera, copying camera, etc. This patent discloses that conventional photographic apparatus such as enlargers are designed so that an easel holding a photosensitive material and a lens can move vertically along a stay. When the easel is in a desired position, the lens travels automatically to a position determined by the lens formula to focus an image o the photosensitive material.

U.S. Pat. No. 4,488,804, issued to Takagi, discloses a method and machine for automatic focusing in a projection system with continuously variable magnification, wherein an original picture is projected onto a photosensitive material by a focusing lens. One of these three members is fixed and the other two members are adapted to be moved in a direction of a light axis.

OBJECTS OF THE INVENTION

It is an object of the present invention to provide a new and improved graphic camera/platemaker optical system having an extended magnification/reduction range and improved access to the copyboard at higher magnifications.

It is also an object of this invention to provide a new and improved graphic camera in which the mirror is located such that the location of the original on the copyboard is linear with respect to the lead edge of the image as magnification changes.

A further object of this invention is to provide a new and improved graphic camera in which the mirror is located so that the copyboard's motion is no longer restricted to positive or negative movements.

Still another object of this invention is to provide a new and improved graphic camera in which the mirror can be located so that the spurious reflection problems inherent in the traditional graphic cameras are reduced.

The foregoing specific objects and advantages of this invention are illustrative of those which can be achieved by the present invention and are not intended to be exhaustive or limiting of the possible advantages which can be realized. Thus, these and other objects and advantages of this invention will be apparent from the description herein or ca be learned from practicing this invention, both as embodied herein or as modified in view of any variations which may be apparent to those skilled in the art. Accordingly, the present invention resides in the novel parts, constructions, arrangements, combinations and improvements herein shown and described.

SUMMARY OF THE INVENTION

The above-mentioned and other objects of the invention are met by a graphic camera/platemaker optical system according to the present invention. In a preferred embodiment, the graphic camera includes a copyboard providing a plane for the original, a lens, a mirror and an image plane. The mirror reflects the light rays coming from the original, positioned on the copyboard, into the lens. The lens then projects an image of the original onto the image plane. In order to meet the above stated objectives, a system according to this invention was devised with three of the optical components — the lens, copyboard and the mirror — moving independently of each other. Specifically, the mirror is optically located between the lens and the copyboard such that it is operable to reflect light at the same angle with respect to the opticle center line through the lens as the mirror moves along a different track from that for the lens.

By moving independently of the lens along a different track, the mirror can be moved to allow an operator to have greater access to the copyboard at higher magnifications and can therefore further extend the magnification/reduction range of the graphic camera. At higher magnifications, the copyboard is raised to a point closer to the lens and therefore closer to the mirror. With the traditional graphic cameras an operator could not open the copyboard cover because it would be blocked by the mirror fixed in space or attached to the lens or connected to the lens so that the mirror moves in concert with the lens. In this invention, however, the independent movement of the mirror along a different track than that for the lens allows the mirror to move upwardly with respect to the lens and away from the copyboard, thereby increasing the ability to open the copyboard cover at these higher magnifications.

The independent movement of the mirror along a different track than that for the lens also extends the reduction capabilities of the graphic camera by locating the mirror so that it can be used in combination with a larger copyboard and shorter focal length lenses. If a shorter focal length lens was used in the traditional graphic cameras, the position of the mirror fixed in space or attached to the lens would make it impossible for the mirror to properly cover the original on the copyboard. In this invention, the independent movement of the mirror enables the mirror to be positioned for shorter focal length lenses and larger copyboards.

Independent movement of the mirror also allows the copyboard movement to no longer be restricted to either positive or negative movements. Typically, copyboard movement toward a higher magnification is always positive (up) and movement toward a lower magnification is always negative (down). However, the independent movement of the mirror allows the copyboard to move either positively or negatively to get a higher magnification and likewise can move either negatively or positively to get a lesser magnification.

Furthermore, the independent movement of the mirror allows the mirror to be located such that the location of the original on the copyboard is linear with respect to the lead edge of the image as magnification changes. With the growing use of less skilled operators, this result makes it easier to properly locate the original on the copyboard regardless of magnification. The location of the original on the copyboard is important because the lead edge of the reproduction must be located the same distance from the head of the plate throughout the magnification and reduction range.

The invention has also been found to reduce the spurious reflection problems common in the traditional graphic cameras. Normally, the illumination of the copyboard is such that only the desired light gets reflected from the mirror through to the image. However, at certain angles between the image plane and the copyboard plane, a secondary reflection, caused by the illumination of the copyboard or ambient light, onto the mirror gets through to the image. Such secondary reflections are reduced as a result of the independent movement of the mirror which allows use of minimum mirror surface area.

It will be appreciated by those skilled in the art that the foregoing brief description and the following detailed description are exemplary and explanatory of this invention, but are not intended to be restrictive thereof or limiting of the advantages which can be achieved by this invention. Thus, the accompanying drawings, referred to herein and constituting a part hereof, illustrate preferred embodiments of this invention and, together with the detailed description, serve to explain the principles of this invention.

BRIEF DESCRIPTION OF THE DRAWINGS

The above and other objects, features and advantages of this invention will be apparent from the following detailed description, especially when taken in conjunction with the accompanying drawings, wherein.

DETAILED DESCRIPTION OF THE PREFERRED EMBODIMENTS

Figure 1:
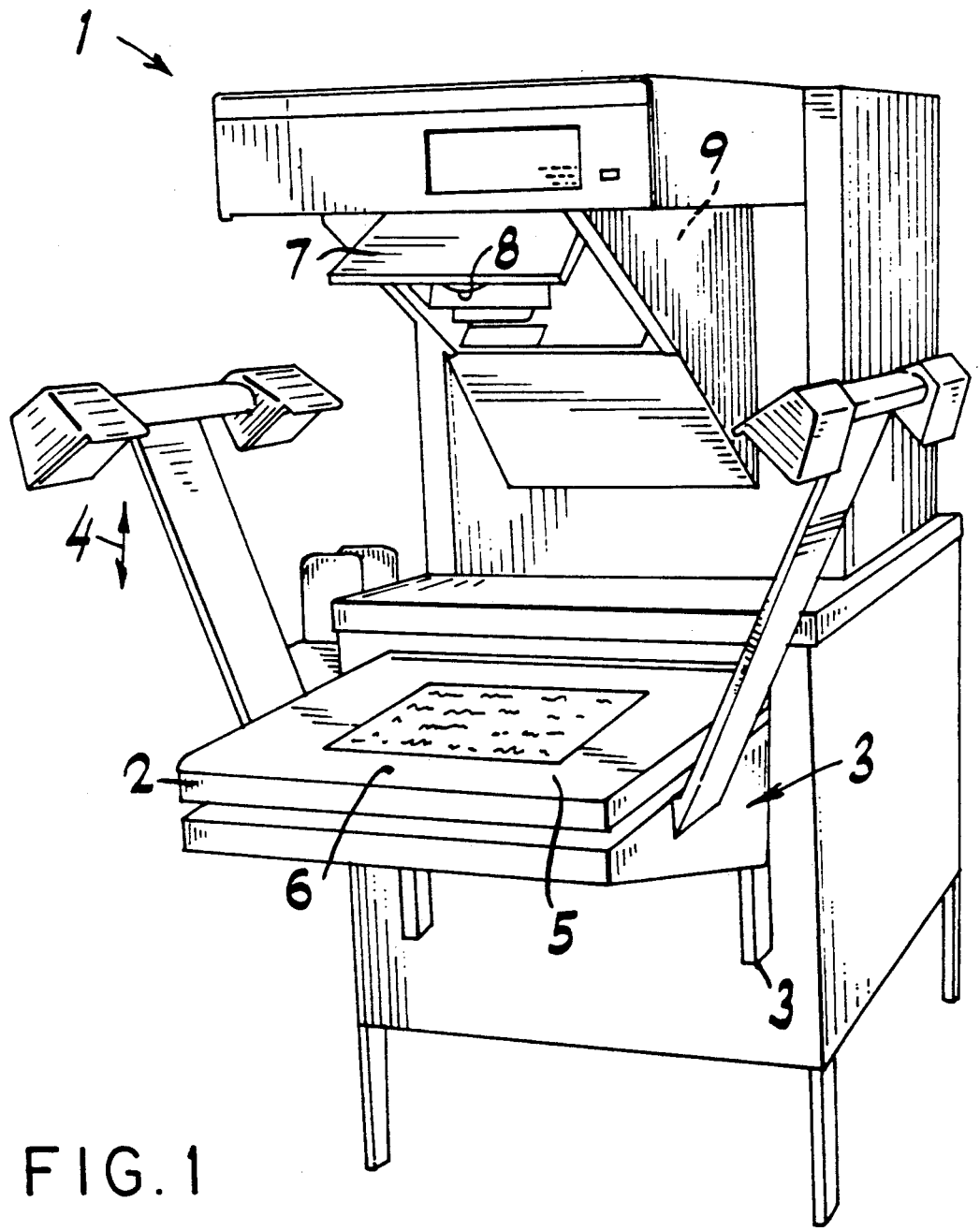
FIG. 1 is a perspective view of the camera/platemaker according to this invention.

The graphic camera/platemaker optical system of this invention is shown diagrammatically in FIG. 1 including stand-like support 1 which supports copyboard 2. The copyboard is mounted on an elevator 3 positioned by a stepping motor which moves the copyboard up and down in the direction of arrow 4. Flat originals or subjects can be arranged on copyboard plane 5 under hinged copyboard cover 6. Image plane 9 is located in a housing attached to support 1 in a position generally above copyboard 2. Image plane 9 is generally perpendicular to copyboard 2 in order to minimize spurious reflection. Movable mirror 7 and movable lens 8 are optically located between copyboard 2 and image plane 9.

Copyboard cover 6 is transparent to allow light rays from copyboard plane 5 to be reflected by mirror 7 through lens 8, which projects an image onto image plane 9. The image plane locates the photosensitive material upon which the image is projected for the production of photographic right reading positives or negatives of the originals on copyboard 2.

Figure 2:
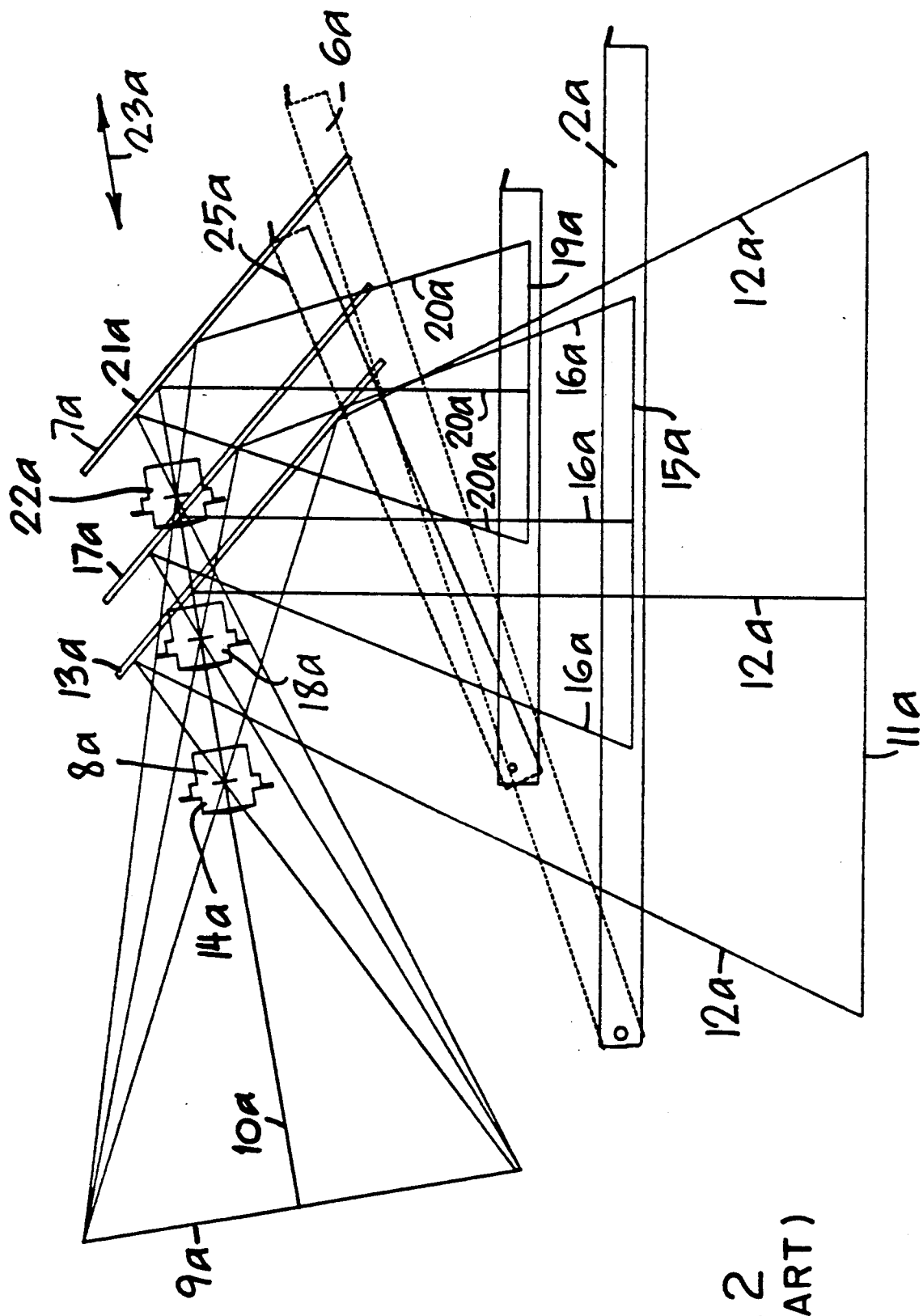
FIG. 2 is a side view functional diagram of a prior art technique moving the mirror along the same track as the lens.
Figure 3:
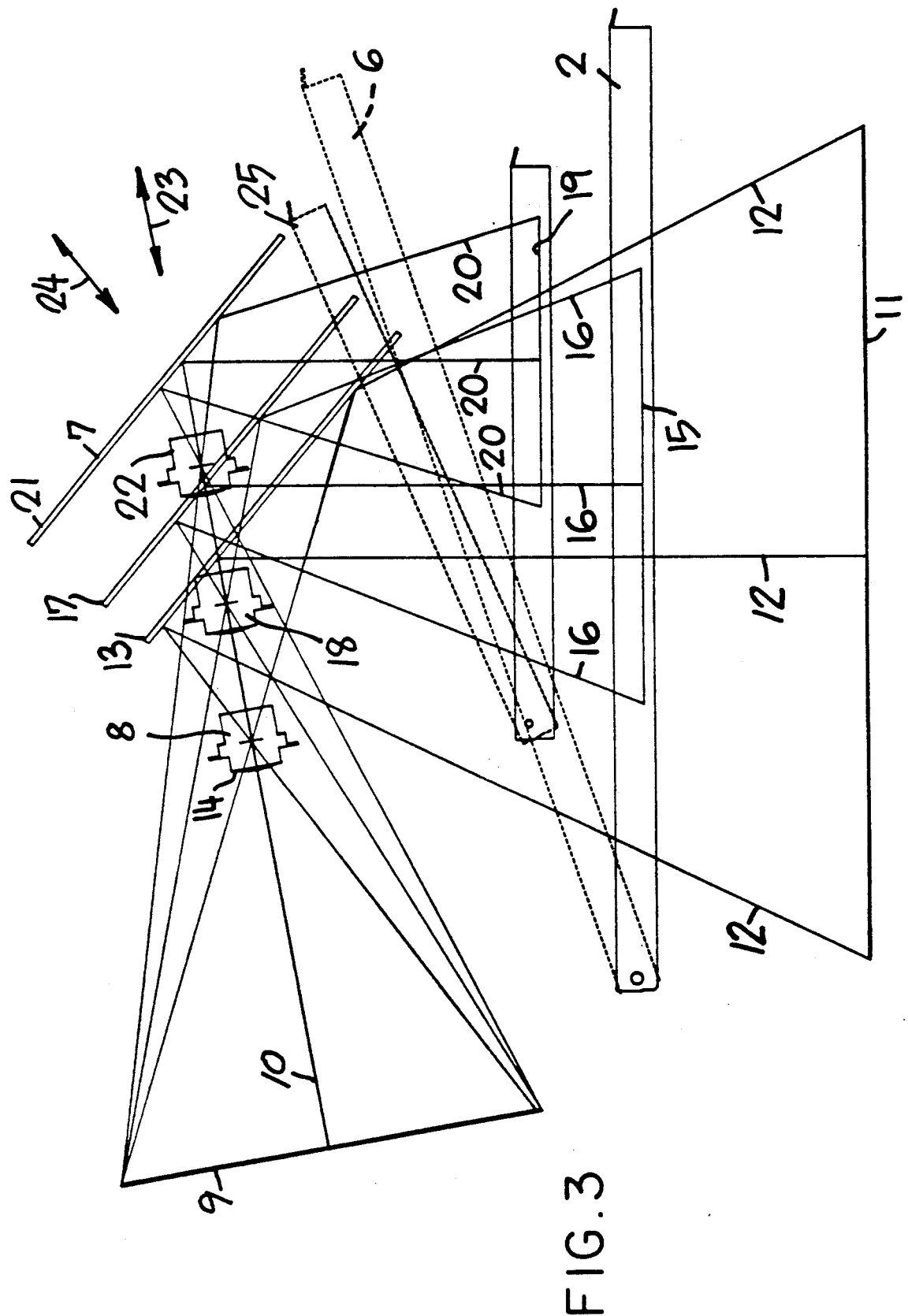
FIG. 3 is a similar side view functional diagram of the graphic camera/platemaker optical system according to this invention.

The technique for moving the optical elements to achieve variable scale reproductions according to this invention is compared with the prior art in FIGS. 2 and 3. In both figures, image plane 9 is fixed, lens 8 moves perpendicular to image plane 9 and copyboard 2 moves vertically.

FIG. 2 illustrates one of the prior art techniques wherein lens 8a and mirror 7a have a spatial relationship controlled by a cam (not shown) which changes the distance between the lens and mirror according to magnification. Lens 8a and mirror 7a move along the same track which coincides with optical center line 10a through the lens. Image plane 9a is fixed while the horizontal copyboard 2a moves vertically for image reduction or magnification. The original may be located on copyboard 2a on plane 11a for image reduction. Light 12a from the original is reflected off the mirror located at position 13a through the lens located at position 14a to provide a reduced size image on image plane 9a. For a one-to-one reproduction, the copyboard is moved upwardly to provide a plane for the original at position 15a. Light 16a is reflected off the mirror located at position 17a through the lens located at position 18a to provide an image on image plane 9a. For image magnification, the copyboard is moved upwardly to provide a plane for the original at position 19a. Light 20a is reflected off the mirror located at position 21a through the lens located at position 22a to provide a magnified image on image plane 9a.

In FIG. 2 lens 8a and mirror 7a move together along the same track in direction 23a which coincides with optical center line 10a through the lens and is perpendicular to image plane 9a. Copyboard 2a moves vertically to provide a horizontal copy plane at different levels. Mirror 7a has a fixed angle relative to optical center line 10a so as to reflect light from the horizontal plane of the original along the optical center line through lens 8a to image plane 9a.

As can be seen in FIG. 2, the opening of copyboard cover 6a to position 25a at the high magnification positions of copyboard 2a is hindered by the position of mirror 7a. For still higher magnification, copyboard 2a would move even closer to mirror 7a making it increasingly difficult to open copyboard cover 6a and 25a.

FIG. 3 illustrates a comparable arrangement according to this invention where lens 8, mirror 7, and copyboard 2 all move independently along separate tracks in different directions. For an image reduction, the original can be located at plane 11 so that light 12 is reflected off the mirror located at position 13 through the lens located at position 14 to provide a reduced image on image plane 9. For a one-to-one reproduction, the plane for the original is moved upwardly to position 15 so that light 16 is reflected off the mirror located at position 17 through the lens located at position 18 to provide an image on image plane 9. For image magnification, the plane for the original is moved upwardly to position 19 so that light 20 is reflected off the mirror located at position 21 through the lens located at position 22 to provide a magnified image on image plane 9.

In FIG. 3, lens 8 still moves along a track in a direction 23 which coincides with optical center line 10 and is perpendicular to image plane 9. Copyboard 2 still moves vertically to provide a horizontal copy plane at different levels. However, mirror 7 moves along a track in direction 24 which is different from the track direction 23 for lens 8. The track for mirror 7 moves the mirror in a direction upwardly and away from copyboard 2. Mirror 7 is operable to reflect light at a constant angle relative to optical center line 10 passing through lens 8. The distance between lens 8 and mirror 7 can vary as shown in FIG. 3. By varying the distance between lens 8 and mirror 7 it becomes possible, for example, to vary the leading edge location for the original on copyboard 2.

An advantage of having mirror 7 move in an upward direction away from copyboard 2 for higher magnifications is that the mirror tends to move out of the way of copyboard cover 6 and 25. Specifically, as illustrated in FIG. 3, the mirror located at position 21 does not hinder the opening of the copyboard cover located at position 25 when the copyboard is located in the uppermost position 19 for a high magnification reproduction.

Figure 4:
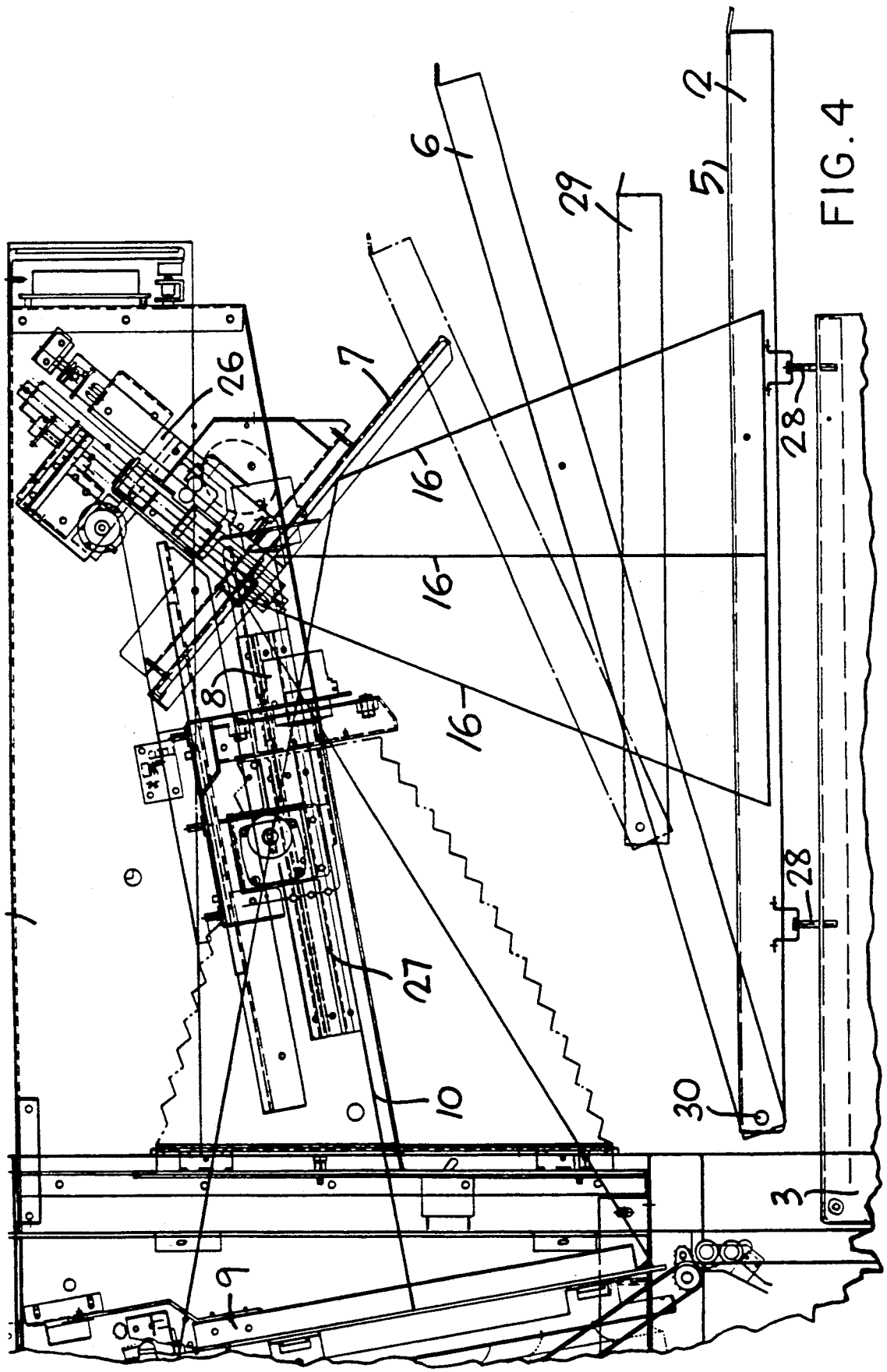
FIG. 4 is a diagram illustrating the apparatus for independent movement of the mirror with respect to the lens and copyboard.

FIG. 4 shows the optical elements and the mechanism used to independently move the elements to achieve higher magnifications and reductions. As can be seen, each of the optical elements — copyboard 2, mirror 7 and lens 8 — move independently of one another. By moving the optical elements, the distance between the original on copyboard plane 5 to the lens and from the lens to the image reflected on image plane 9 changes resulting in a different magnification/reduction scale reproduction. Stepping motors, such as described by U.S. Pat. No. 4,451,142, issued to Takenaka et al., can be used to move the optical elements. The stepping motors are controlled by a microcomputer, which adds the number of pulses for forward rotation steps of the stepping motors and subtracts for the reverse rotation thereof. The microcomputer stores the positions of each of the motors and controls the positioning of the optical elements by adding or subtracting the number of pulses or steps corresponding to desired movements. Mirror 7 is mounted on a carriage that moves along track 26 secured to support 1. Track 26 is oriented in the direction 24 shown in FIG. 3. The carriage moves along the track using rollers and is positioned by a stepping motor. The mirror is set at an angle so that it reflects light from copyboard 2 at a constant angle with respect to the optical center line 10 through lens 8. Lens 8 is mounted on a carriage that moves along separate track 27 which is also secured to support 1. The carriage moves along track 27 using rollers and is positioned by a separate stepping motor. Lens 8 movement is in direction 23 (FIG. 3) along optical center line 10 perpendicular to image plane 9 which is different than the track direction for mirror 7. Copyboard 2 is secured to elevator 3 by screw-down fastener 28. Since the originals are usually small for high magnification, an auxiliary copyboard 29 may be used at higher magnifications. Copyboard 2 is moveable up and down as elevator 3 is positioned vertically by a separate stepping motor. Copyboard cover 6 is connected to the copyboard by hinge 30. FIG. 4 illustrates copyboards with the cover shown open so the operator can place an original on the surface of the copyboard.

Image plane 9 is fixed to stand-like support 1 in a position which is generally perpendicular to copyboard 2 in order to minimize spurious reflection. Photosensitive material is loaded onto and unloaded from image plane 9 via a transport mechanism driven by a drive motor.

By providing a moving mirror 7 which moves independently along separate track 26 and is positioned by a separate stepping motor from lens 8 which moves along track 27, the operator has access to copyboard 2 at higher magnifications. At higher magnifications, copyboard 2 is raised and moved closer to lens 8 and mirror 7. With the traditional graphic cameras, the operator could not open the copyboard cover at high magnifications because it would be blocked by the mirror fixed in space or attached to the lens or connected to the lens so that it moves in concert with the lens. In the camera/platemaker according to this invention, however, the independent movement of mirror 7 along a separate track from that for lens 8 allows the mirror to move upwardly with respect to the lens and copyboard 2 so that it moves away from the copyboard, thereby increasing the ability to open copyboard cover 6 at these higher magnifications. The magnification range compared to a traditional graphic camera has been increased from 105% magnification to 150% magnification.

The independent movement of mirror 7 along separate track 26 from that for lens 8 also extends the reduction capabilities of the graphic camera since the mirror can be located for use with larger copyboards and/or shorter focal length lenses. For example, the reduction range of a traditional graphic camera can be improved from 65% to 45%. The focal length of the lens can be reduced to 12" from 15" or 18". If such shorter focal length lenses were used in the traditional graphic cameras, the mirror would not properly cover the original on the copyboard. The independent movement of the mirror enables the mirror to be positioned for shorter focal length lenses and larger copyboards.

Another advantage of the independent movement of mirror 7 along separate track 26 from that for lens 8 is that the movement of copyboard 2 is not restricted to either positive or negative movements. Typically, copyboard movement toward a higher magnification is positive (up) and toward a lower magnification is negative (down). The independent movement of mirror 7 allows copyboard 2 to move in the negative direction for increased magnification. Likewise, the copyboard can move in the positive direction to decrease magnification. TABLE I shows the possible relative mirror and copyboard locations for different magnifications. TABLE I illustrates that magnification increases can be achieved by either positive or negative movements of the copyboard and by either positive or negative movements of the mirror.

TABLE I

| Magnification | Mirror Location | Copyboard Location |
|---|---|---|
| .45 | −2.260185 | −11.48463 |
| .53 | −1.751363 | −7.665602 |
| .63 | −.5520286 | −3.428344 |
| .73 | .05652905 | −1.083624 |
| .83 | .2878438 | .05260945 |
| .93 | .2636072 | .3701910 |
| 1.03 | .05825153 | .1075626 |
| 1.13 | .8742619 | −2.562437 |
| 1.23 | 1.878285 | −1.362465 |
| 1.33 | 2.804410 | −.4120374 |
| 1.43 | 3.668978 | .3411965 |
| 1.50 | 4.244144 | .7722506 |

The independent movement of mirror 7 along separate track 26 also allows the mirror to be located such that the location of the lead edge of the original on copyboard 2 is linear with respect to the lead edge of the image as magnification changes. The traditional graphic cameras tend to have a non linear copy location with respect to the lead edge of the image. With the growing use of less skilled operators, a linear original location makes it easier to properly locate the original on the copyboard regardless of magnification. This location is important since the lead edge of the copy must be located the same distance from the head of the plate throughout the magnification and reduction range.

Figure 5:
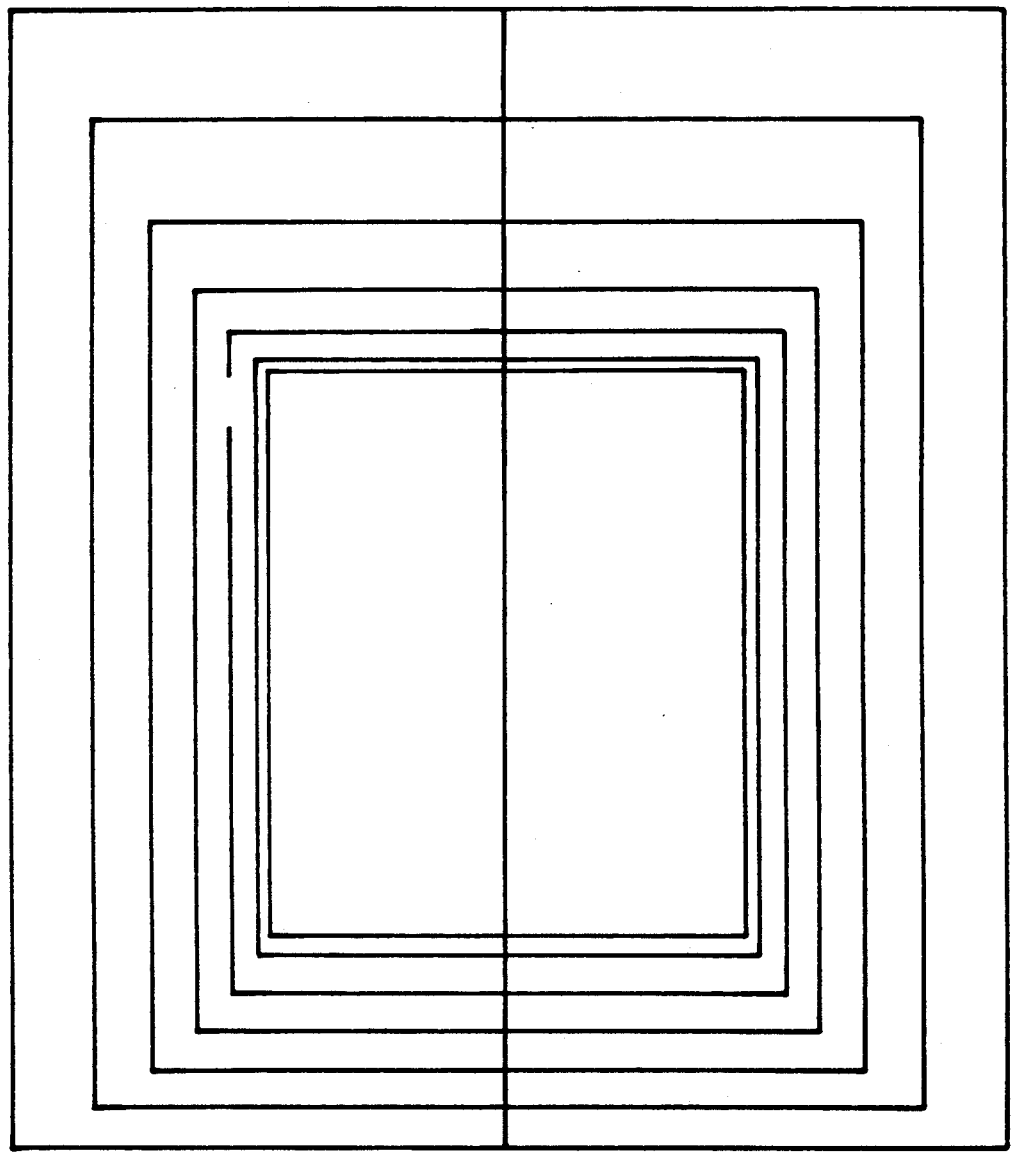
FIG. 5 is a detailed diagram showing the positioning of the original on the copyboard for 10% magnification increments.

As a result of the linear relationship of the magnification to the original location on copyboard 2 according to this invention, simple platemaker copyboard charts can be devised as shown in FIG. 5. Such charts show the location for the original on the copyboard for 10% magnification increments. The chart is simple and logical because of the linear relationship of the lead edge of the original to the magnification. The chart can be mounted on the copyboard for convenient use by the operator.

Finally, the independent movement of mirror 7 along separate track 26 from that for lens 8 reduces the spurious reflection problems common in the traditional graphic cameras. Normally, the illumination of the copyboard is such that only the desired light gets reflected from the mirror through to the image. However, at certain angles between the image plane and the copyboard plane, a secondary reflection, caused by the illumination of the copyboard or ambient light, into the mirror gets through to the image. The traditional graphic camera mirror could not be located to avoid spurious reflections since their movement was restricted, i.e. either fixed in space or attached to the lens or designed to move in concert with the lens. Such secondary reflections are reduced as a result of the independent movement of the optical elements according to this invention which allows use of minimum mirror surface area and a number of different mirror positions to avoid positions that cause the secondary reflections.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used as terms of description and not terms of limitation. There is no intention to use the terms or expressions to exclude any equivalents of features shown and described or portions thereof and this invention should be defined in accordance with the claims which follow.

What is claimed is:

1. A graphic camera/platemaker optical system with a range of reduction and magnification for creating an image of an original on a photosensitive material comprising:
   an image plane for the photosensitive material;
   a lens movable along a track perpendicular to said image plane;
   a copyboard providing a plane for the original at an angle to said image plane and movable independently of said lens location; and
   a mirror optically located between said lens and said copyboard such that said mirror is operable to reflect light at a constant angle with respect to an optical center line through said lens and is movable along a different track from that for said lens.

2. A graphic camera/platemaker optical system with a range of reduction and magnification for creating an image of an original on a photosensitive material comprising:

an image plane for the photosensitive material;

a lens movable along a track perpendicular to said image plane;

a copyboard providing a plane for the original at an angle to said image plane and movable independently of said lens location; and a mirror optically located between said lens and said copyboard such that said mirror is operable to reflect light at a constant angle with respect to an optical center line through said lens and is movable along a different track from that for said lens, wherein movement of said mirror and said copyboard are coordinated in order to maintain a linear location of a lead edge of the original on said copyboard with respect to a lead edge of the image produced as magnification changes.

3. A graphic camera/platemaker optical system with a range of reduction and magnification for creating an image of an original on a photosensitive material comprising:

an image plane for the photosensitive material;

a lens movable along a track perpendicular to said image plane;

a copyboard providing a plane for the original at an angle to said image plane and movable independently of said lens location; and a mirror optically located between said lens and said copyboard such that said mirror is operable to reflect light at a constant angle with respect to an optical center line through said lens and wherein said mirror is movable upwardly with respect to said copyboard so that it is movable away from said copyboard for access at higher magnifications, wherein movement of said mirror and said copyboard are coordinated so that said copyboard is movable in a positive or negative direction for higher magnifications.

4. An optical system according to claim 1, 2 or 3, wherein said copyboard is generally perpendicular to said image plane.

5. An optical system according to claim 1 or 2, wherein said mirror is movable upwardly with respect to said lens and copyboard so that it moves in a direction away from said copyboard at higher magnifications.

6. An optical system according to claim 5, wherein a hinged cover overlies said copyboard in order to cover the original located on said plane of said copyboard and wherein said mirror moves to provide greater access to said hinged cover at higher magnifications.

7. An optical system according to claim 1, 2 or 3, wherein said mirror is movable for extending reduction range.

8. An optical system according to claim 1, 2 or 3, wherein said mirror is independently movable such that spurious reflection can be reduced.

9. An optical system according to claim 1, 2 or 3, further comprising independent drive means for positioning said mirror, lens and copyboard.

10. An optical system according to claim 9, further comprising a microprocessor controller for said independent drive means.

11. An optical system according to claim 1, 2 or 3, wherein various size copyboards may be used.

12. An optical system according to claim 1, 2 or 3, wherein the magnification range is from greater than 100% to 150%.

13. An optical system according to claim 1, 2 or 3, wherein the reduction range is from less than 100% to 45%.

14. An optical system according to claim 1, 2 or 3, wherein said lens has a focal length range of from 12" to 18".

15. In a method of producing an image of an original utilizing a graphic camera/platemaker optical system with a range of reduction and magnification which comprises moving a mirror, a lens and a copyboard wherein said mirror is optically located between said lens and said copyboard such that said mirror is operable to reflect light at a constant angle with respect to an optical center line through said lens, the improvement wherein said mirror, lens and copyboard are movable along different tracks and said mirror, lens and copyboard are movable independently of each other with said mirror moving upwardly with respect to said lens and copyboard in a direction away from said copyboard at higher magnifications.

16. In a method of producing an image of an original utilizing a graphic camera/platemaker optical system with a range of reduction and magnification which comprises moving a mirror, a lens and a copyboard wherein said mirror is optically located between said lens and said copyboard such that said mirror is operable to reflect light at a constant angle with respect to an optical center line through said lens, the improvement wherein said mirror, lens and copyboard are movable along different tracks and said mirror, lens and copyboard are movable independent of each other with said mirror and copyboard movement being coordinated to maintain a linear location of the lead edge of said original on said copyboard with respect to the lead edge of said image produced as magnification changes.

17. In a method of producing an image of an original utilizing a graphic camera/platemaker optical system with a range of reduction and magnification which comprises moving a mirror, a lens and a copyboard wherein said mirror is optically located between said lens and said copyboard such that said mirror is operable to reflect light at a constant angle with respect to an optical center line through said lens, the improvement wherein said mirror, lens and copyboard are each movable independent of one another in different directions wherein movement of said mirror and copyboard are coordinated so that said copyboard is movable in a negative or positive direction for higher magnifications.

18. The method as in claims 16 or 17, wherein said mirror is movable upwardly with respect to said copyboard so that it is movable away from said copyboard for access at higher magnifications.

19. The method as in claim 15, 16 or 17, wherein said mirror is movable for extending the reduction range.

20. The method as in claim 15, 16 or 17, wherein said mirror is movable such that spurious reflection is reduced.

* * * * *

UNITED STATES PATENT AND TRADEMARK OFFICE
CERTIFICATE OF CORRECTION

PATENT NO. : 5,091,745
DATED : February 25, 1992
INVENTOR(S) : Robert H. Powers and Daniel L. Robbins It is certified that error appears in the above-identified patent and that said Letters Patent is hereby corrected as shown below:

In Column 2, line 33, change "o" to "on".

In Column 2, line 58, change "ca" to "can".

In Column 6, line 42, begin new paragraph prior to "Mirror 7. . .".

In Column 6, line 49, begin new paragraph prior to "Lens 8. . .".

In Column 6, line 56, begin new paragraph prior to "Copyboard 2. . .".

In Column 6, line 57, change "fastener" to "fasteners".

Signed and Sealed this

Twenty-second Day of June, 1993

Attest:

MICHAEL K. KIRK

*Attesting Officer*    *Acting Commissioner of Patents and Trademarks*